(No Model.)

J. S. SELLON.
SECONDARY BATTERY.

No. 454,187. Patented June 16, 1891.

Witnesses
Geo. W. Breck
Carrie E. Ashley

Inventor
John S. Sellon,
By his Attorney

UNITED STATES PATENT OFFICE.

JOHN S. SELLON, OF LONDON, ENGLAND, ASSIGNOR, BY MESNE ASSIGNMENTS, TO THE ACCUMULATOR COMPANY, OF NEW JERSEY.

SECONDARY BATTERY.

SPECIFICATION forming part of Letters Patent No. 454,187, dated June 16, 1891.

Original application filed April 26, 1887, Serial No. 236,208. Divided and this application filed June 27, 1888. Serial No. 278,314. (No model.) Patented in England September 15, 1881, No. 3,987.

*To all whom it may concern:*

Be it known that I, JOHN SCUDAMORE SELLON, a subject of the Queen of Great Britain and Ireland, residing at Hatton Garden, in the county of Middlesex, England, have invented certain new and useful Improvements in Secondary Batteries, (for which I have obtained a patent in Great Britain, No. 3,987, dated September 15, 1881,) of which the following is a specification.

My invention relates to improvements in the construction and arrangement of batteries known as "secondary batteries" used for the purpose of storing electricity.

My object is to provide a plate or support which will be less subject to oxidation and which may be made lighter, while possessing greater rigidity or resistance to the contortion likely to be encountered in the process of formation or charging.

The improvements consist in the employment of plates or elements composed of two or more metals, of which lead and antimony are essential, and either made to adhere by mechanical pressure or other equivalent means, or by the employment of metallic plates consisting of alloys of lead and antimony, either with or without the use and application of an amalgam thereof.

The form of plate or element preferred is one having grooves, perforations, or receptacles, in or upon which the active material or materials to be rendered active are placed. Several appropriate forms are shown in my English patent, No. 3,987, dated September 15, 1881, and my United States patent, No. 259,657, dated June 13, 1882.

The accompanying drawings illustrate the preferred forms.

Figure 1:
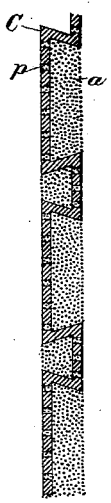
Figure 2:
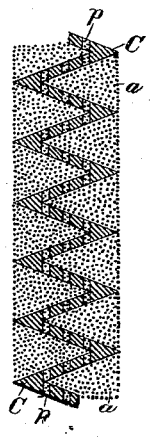
Figure 3:
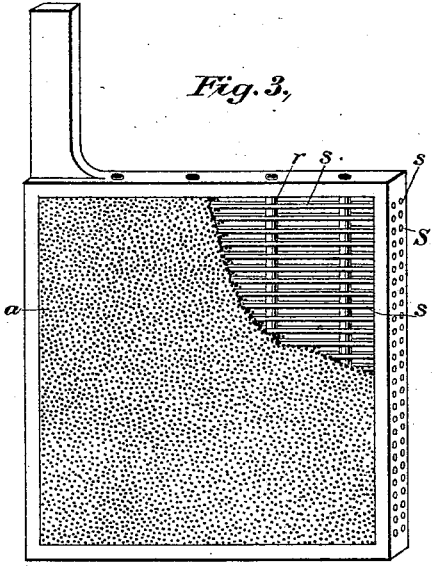
Figure 4:
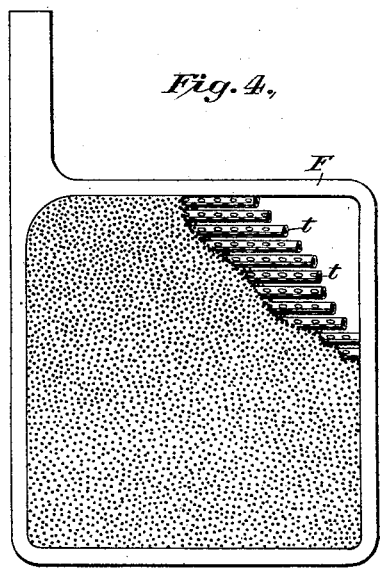

Figure 1 is a perforated plate having folds or corrugations in which the active material is placed. Fig. 2 is a variation comprising substantially the same features. Fig. 3 shows a modification in which the strips are strung upon vertical rods in a frame. Fig. 4 shows an element composed of a number of perforated tubes, of any suitable section, supported in a frame.

In the process of manufacture I prefer that lead and antimony be mingled in a state of fusion. From five to twenty-five per cent. of antimony gives good results; but even a lower proportion of antimony may be successfully employed. A small amount of mercury to form an amalgam added to this alloy materially aids the union and by its presence contributes somewhat to the beneficial results.

In the form shown at Figs. 1 and 2 the alloy plate $c$ is provided with perforations $p$, and folds forming cells, in and upon which the finely-divided active material, as a lead oxide or finely-divided lead $a$, is applied.

In Fig. 3 there are perforated strips of the lead alloy S, connected together to form a frame-supporting strip $s$ of the same material. To render this structure still more rigid, vertical rods $r$ are passed through the strips.

In Fig. 4 there is a frame F, containing perforated tubes $t$ of the described alloy, in and upon which the active material is placed.

Connections for electrically uniting one cell with another consist of straps formed integral with and of the same material as the plate or support. I consider that a sheet of antimony and a sheet of lead united by pressure or equivalent means are within the scope of my invention.

This application is a division of my application filed on the 26th day of April, 1887, Serial No. 236,208, such division being rendered necessary by the fact that the subject-matter therein claimed is patented to me in Great Britain and several other foreign countries, while the subject-matter claimed in this application is only patented in one of said foreign countries—to wit, Great Britain.

I do not herein claim a plate, element, or support containing lead and antimony in combination with an active material; nor do I herein claim, in a secondary battery, the combination of a perforated plate, element, or support containing lead and antimony combined with an active material, as that forms the subject-matter of a pending application filed April 26, 1887, Serial No. 236,208.

What I claim, and desire to secure by Letters Patent, is—

1. In a secondary battery, a plate or support containing an alloy of two metals and an amalgam thereof.

2. In a secondary battery, an element composed of a plate or support containing an alloy of two or more metals with an amalgam thereof, in combination with an active material applied thereto.

3. In a secondary battery, plates, elements, or supports composed of two or more metals and an amalgam thereof, substantially as described, in combination with an active material or compound applied thereto.

JOHN S. SELLON.

Witnesses:
FRED. GOATER,
R. CALLON,
*Both of 9 Birchin Lane, London, E. C.*